United States Patent
Dandekar et al.

(10) Patent No.: US 7,706,750 B2
(45) Date of Patent: Apr. 27, 2010

(54) ENABLING BLUETOOTH SUPPORT WITHIN A SECONDARY AND/OR ACROSS MULTIPLE OPERATING SYSTEM PARTITIONS

(75) Inventors: Shree A. Dandekar, Round Rock, TX (US); Pratik M. Mehta, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 490 days.

(21) Appl. No.: 11/744,926

(22) Filed: May 7, 2007

(65) Prior Publication Data

US 2008/0280559 A1    Nov. 13, 2008

(51) Int. Cl.
    *H04B 7/00* (2006.01)
(52) U.S. Cl. .................... 455/41.2; 455/426.1; 455/418; 455/192.2; 713/1; 711/173
(58) Field of Classification Search ................. 455/41.2, 455/426.1, 418, 420, 192.2, 186.1; 713/1, 713/2; 711/173
    See application file for complete search history.

(56) References Cited

U.S. PATENT DOCUMENTS

| | | | |
|---|---|---|---|
| 7,149,474 B1 * | 12/2006 | Mikhak ...................... | 455/41.2 |
| 7,529,237 B2 * | 5/2009 | Ami et al. .................... | 370/389 |
| 7,593,605 B2 * | 9/2009 | King et al. .................. | 382/313 |
| 2002/0131388 A1 * | 9/2002 | Ami et al. .................... | 370/338 |
| 2003/0041119 A1 * | 2/2003 | Bisdikian et al. ............ | 709/219 |
| 2005/0059379 A1 | 3/2005 | Sovio et al. ................. | 455/411 |
| 2005/0266826 A1 * | 12/2005 | Vlad .......................... | 455/410 |
| 2006/0083187 A1 | 4/2006 | Dekel ......................... | 370/310 |
| 2006/0094359 A1 | 5/2006 | Kim .......................... | 455/41.2 |
| 2006/0094402 A1 | 5/2006 | Kim .......................... | 455/411 |
| 2006/0094461 A1 * | 5/2006 | Hameed et al. .......... | 455/552.1 |
| 2006/0095771 A1 | 5/2006 | Appenzeller et al. ........ | 713/171 |
| 2006/0095941 A1 | 5/2006 | Fidler et al. .................... | 725/81 |
| 2006/0135064 A1 | 6/2006 | Cho et al. .................. | 455/41.1 |
| 2006/0143455 A1 | 6/2006 | Gitzinger .................... | 713/170 |
| 2006/0146777 A1 * | 7/2006 | Ami et al. ................... | 370/338 |
| 2006/0165060 A1 * | 7/2006 | Dua ........................... | 370/352 |
| 2006/0199537 A1 | 9/2006 | Eisenbach .................. | 455/41.2 |
| 2006/0199538 A1 | 9/2006 | Eisenbach .................. | 455/41.2 |
| 2007/0294556 A1 * | 12/2007 | Wutka ........................ | 713/324 |
| 2008/0163239 A1 * | 7/2008 | Sugumar et al. ............ | 718/105 |
| 2008/0263363 A1 * | 10/2008 | Jueneman et al. ........... | 713/184 |
| 2009/0017755 A1 * | 1/2009 | Tomoda ..................... | 455/41.2 |
| 2009/0132197 A1 * | 5/2009 | Rubin et al. ................. | 702/141 |

(Continued)

OTHER PUBLICATIONS http://www.windowsdevcenter.com/pub/a/windows/2005/07/05/bluetooth.html; Lee, Wei-Meng "Getting Your Bluetooth Headset to Work in XP" *O'Reilly Windows DevCenter*, Jul. 5, 2005 (14 pages).

(Continued)

*Primary Examiner*—Minh D Dao
(74) *Attorney, Agent, or Firm*—Hamilton & Terrile, LLP; Stephen A. Terrile

(57) ABSTRACT

A method for sharing Bluetooth pairs across multiple operating system partitions. The method includes the steps of pairing a first operating system partition with a Bluetooth enabled device; determining when a memory of an information handling system includes an additional operating system partition; and, pairing the additional operating system partition with the Bluetooth enabled device when the additional operating system partition is present.

12 Claims, 6 Drawing Sheets

U.S. PATENT DOCUMENTS

2009/0249247 A1* 10/2009 Tseng et al. ............... 715/808
2009/0268754 A1* 10/2009 Palm et al. ................ 370/466

OTHER PUBLICATIONS http://lion.cs.uiuc.edu/assistedliving/presentations/Architecture2. ppt; Wang, Qixin "Software Architecture" Jan. 17, 2006 (48 pages).
http://support.microsoft.com/?kbid=873154; "A Bluetooth Keyboard or Mouse Does Not Work When you Start Windows XP Service Pack 2 or Windows XP Tablet PC Edition" Microsoft.com, Nov. 16, 2004 (2 pages).
http://www.bluetooth.com; "The Official Bluetooth® Technology Info Site" *Bluetooth SIG, Inc.* 2007 (1 pg).
http://www.bluetooth.com/NR/rdonlyres/0A0B3F36-D15F-4470-85A6-F2CCFA26F70F/0/ SimplePairing_ WP_V10r00.pdf; Linsky, Joel et al. "Simple Pairing Whitepaper" *Bluetooth Special Interest Group*, Aug. 3, 2006 (23 pages).
http://www.btdesigner.com/devsoft.htm "BT Designer:Development Software" *BT Designer* Jul. 29, 2007 (2 pgs.).
http://www.oreillynet.com/pub/a/wireless/2002/11/27/sms.html; Lee, Wei-Meng "Use Bluetooth for SMS" *O'Reilly Wireless DevCenter*, Nov. 27, 2005 (5 pages).
http://www.schneier.com/blog/archives/2005/06/ attack_on_the_b_1.html; Schneier, Bruce "Schneier on Security: Attack on the Bluetooth Pairing Process" *Schneier Blog*, Jun. 3, 2005 (12 pages).
http://www.thewirelessdirectory.com/Bluetooth-Software/ Bluetooth-Protocol-Stack.htm; "Bluetooth Protocol Stack" *The Wireless Directory of Bluetooth Products & Services*, Dec. 3, 2003 (17 pages).

* cited by examiner

ENABLING BLUETOOTH SUPPORT WITHIN A SECONDARY AND/OR ACROSS MULTIPLE OPERATING SYSTEM PARTITIONS

BACKGROUND OF THE INVENTION

1. Field of the Invention

The present invention relates to information handling systems and more particularly to providing Bluetooth support across multiple operating system partitions of an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is often desirable to couple devices with an information handling system. One known method of coupling devices is via a Bluetooth type connection. Bluetooth is an industrial specification for creating wireless personal area networks (PANs). Bluetooth provides a method to connect and exchange information between devices such as information handling systems, mobile phones, printers, digital cameras and video game consoles via a secure, globally unlicensed short-range radio frequency. The Bluetooth specification is developed by the Bluetooth Special Interest Group One issue of a Bluetooth type connection relates to pairing. Pairing is how two devices (e.g., a phone and a headset) associate themselves with one another to create a Bluetooth type connection. The two devices generate a shared secret code that is used for all future communication between the devices. When two devices are paired, the devices can be sure about the identity of the other party. Pairing usually occurs one time between two devices. After pairing, connections between the two devices are authenticated automatically. According to the Bluetooth specification, the shared secret code (or PIN) can be between 8 and 128 bits long.

FIG. 1, labeled Prior Art, shows a flow chart of a Bluetooth pairing operation. The Master device is typically the Bluetooth device installed in within an information handling system while the Slave device is typically a hard coded device such as a headset or mouse.

There are five phases of involved in a pairing operation. A public key exchange phase (Phase 1); an authentication Stage 1 phase (Phase 2); an authentication Stage 2 phase (Phase 3); a link key calculation phase (Phase 4); and, a link manager protocol (LMP) authentication and encryption phase (Phase 5). Phases 1, 3, 4 and 5 are the same for all protocols whereas phase 2 (Authentication Stage 1) may differ depending on the protocol used. The Bluetooth Simple Pairing Whitepaper (2006) published by the Bluetooth Special Interest Group discusses the Bluetooth pairing operation in more detail.

More specifically, when initiating a pairing operation, an initiating device 100 (Device A, the master device) and a non-initiating device 102 (Device B, the slave device) start in a standby mode 110, 112, respectively. The initiating device is for example a primary operating system of an information handling system. The non-initiating device 102 is for example a Bluetooth keyboard or mouse. The initiating device 100 initiates an inquiry at step 120 and the non-initiating device 102 performs an inquiry scan and generates a response at step 122. With the inquiry and the response, the initiating device 100 and the non-initiating device 102 exchange a public key.

Next, the initiating device selects a pseudo-random nonce value Ra at step 130 and the non-initiating device 102 selects a pseudo-random nonce value Rb at step 132. The nonce value Ra is a unique random value from the initiating device 100 and the nonce value Rb is a unique random value from the non-initiating device 102. Next, the initiating device 100 sets the nonce value Ra to 0 at step 134 and the non-initiating device 102 sets the nonce value Rb to 0 at step 136. The nonce values Ra and Rb are for example, 128 bit values.

Next, the non-initiating device 102 computers a commitment value Cb at step 140. This commitment value is provided to the initiating device 100, which in reply provides the non-initiating device 102 with the nonce value Na. The non-initiating device 102 then provides the nonce value Nb to the initiating device 100, which then confirms the commitment value Cb at step 142. Next, the initiating device 100 computes a confirmation value Va at step 150 and the non-initiating device computes a confirmation value Vb at step 152 and a user confirms whether the confirmation values Va and Vb are equal on each device. The commitment values Ca, Cb, Va and Vb may be for example 6 digit values.

Next, the initiating device 100 computes a new confirmation value Ea (i.e., a check value) and provides this value to the non-initiating device at step 160 and the non-initiating device 102 computes a new confirmation value Eb (i.e., a check value) at step 162. Next, the non-initiating device 102 checks the confirmation value Ea and provides the confirmation value Eb to the initiating device at step 164. Next, the initiating device 100 checks the confirmation value Eb at step 166.

If the confirmation values Ea and Eb match, then the initiating device 100 and the non-initiating device 102 perform a link key calculation (Lr) at step 170 and then set up an encrypted communication session at step 172.

When a Bluetooth pair is formed between an operating system (OS) of an information handling system and a Bluetooth (BT) device, the information handling system OS is treated as a unique BT device to establish the pairing.

According to the current pairing process if there is a secondary OS present on the same system then the secondary OS will not be able to pair with the Slave device that was already paired with the Primary OS. So, for example, if a secondary initiating device 180 attempts to communicate with the non-initiating device at step 182, another public key exchange would be initiated. Each OS is identified as a new device and the Bluetooth secret key associated between one operating system and Bluetooth device does not work on the other OS.

This situation can lead to a bad customer experience, especially if a user desires to use a Bluetooth device on more than one operating system shipped on the same information handling system. For example, if a user purchases a Bluetooth enabled headset for use with an information handling system that includes a main operating system partition as well as a MediaDirect operating system partition, the user might not be able to use the headset when the information handling system is operating in a MediaDirect partition, even if the same BT drivers are installed on that partition.

In certain information handling systems, this issue has been addressed by switching from a Host Controller Interface (HCI) mode of operation to a Human Interface Device (HID) mode of operation when a user boots into the secondary OS partition for MediaDirect. Thus, a customer can continue to use a Keyboard and Mouse as a conventional USB device. The HID mode of operation is a universal serial bus (USB) protocol used by conventional USB mice and keyboards, and implemented in the basic input output system (BIOS) of many information handling system motherboards. However, many Bluetooth enabled peripherals do not have the ability to store multiple pairing data for reasons of cost, power and implementation complexity.

SUMMARY OF THE INVENTION

In accordance with the present invention, a method for sharing Bluetooth pairs across multiple operating system partitions is set forth. The operating system across multiple partitions can be heterogeneous.

More specifically, in one embodiment, the invention relates to a method for sharing Bluetooth pairs across multiple operating system partitions. The method includes the steps of pairing a first operating system partition with a Bluetooth enabled device; determining when a memory of an information handling system includes an additional operating system partition; and, pairing the additional operating system partition with the Bluetooth enabled device when the additional operating system partition is present.

In another embodiment, the invention relates to an apparatus for sharing Bluetooth pairs across multiple operating system partitions within an information handling system which includes means for pairing a first operating system partition with a Bluetooth enabled device, means for determining when a memory of an information handling system includes an additional operating system partition, and means for pairing the additional operating system partition with the Bluetooth enabled device when the additional operating system partition is present.

In another embodiment, the invention relates to an information handling system within an information handling system which includes a processor and memory coupled to the processor. The memory comprises a plurality of operating system partitions and stores a system for sharing Bluetooth pairs across multiple operating system partitions. The system comprises instructions executable by the processor for pairing a first operating system partition with a Bluetooth enabled device, determining when a memory of an information handling system includes an additional operating system partition, and pairing the additional operating system partition with the Bluetooth enabled device when the additional operating system partition is present.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
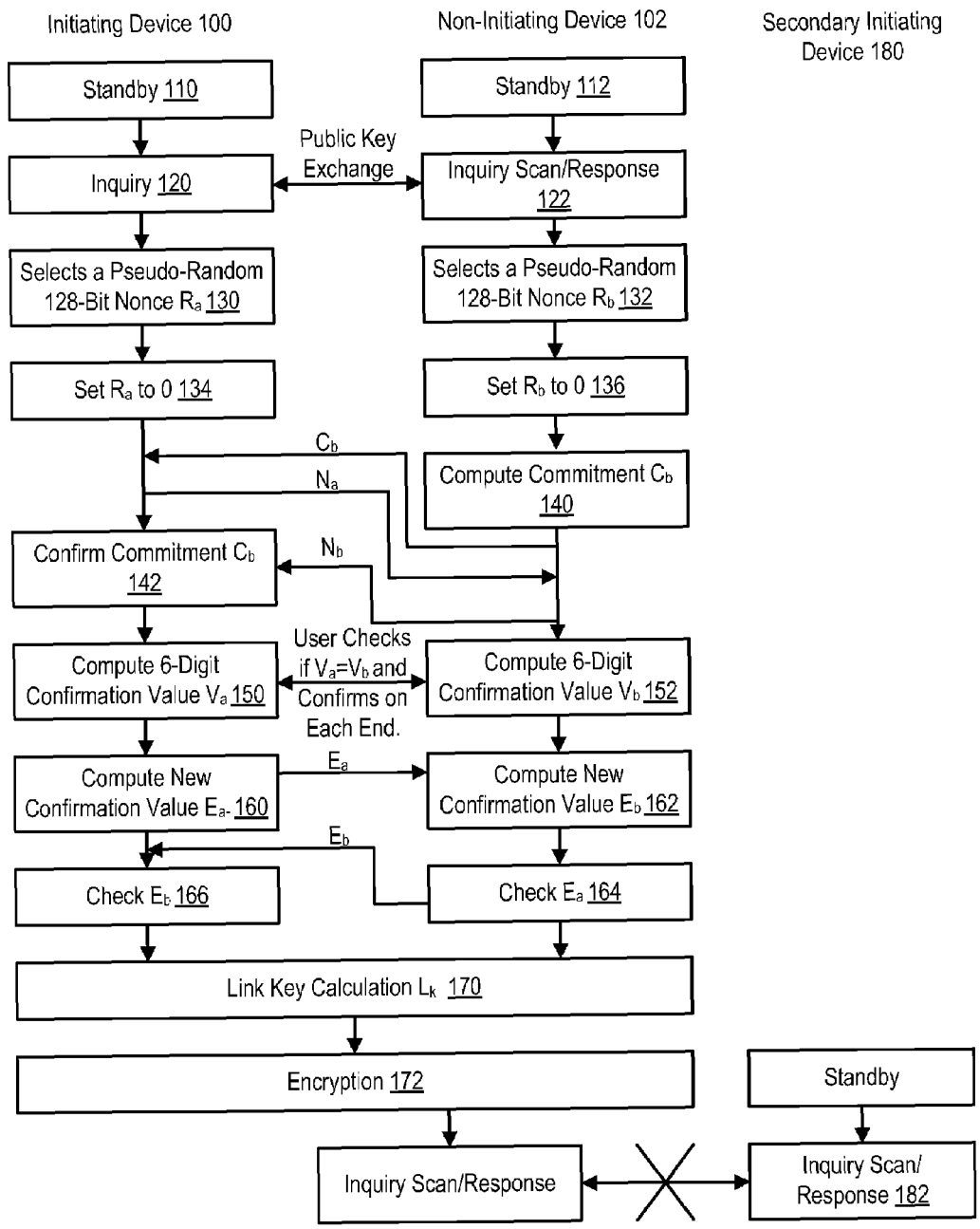
FIG. 1, labeled Prior Art, shows a flow chart of a BlueTooth pairing operation.
Figure 2:
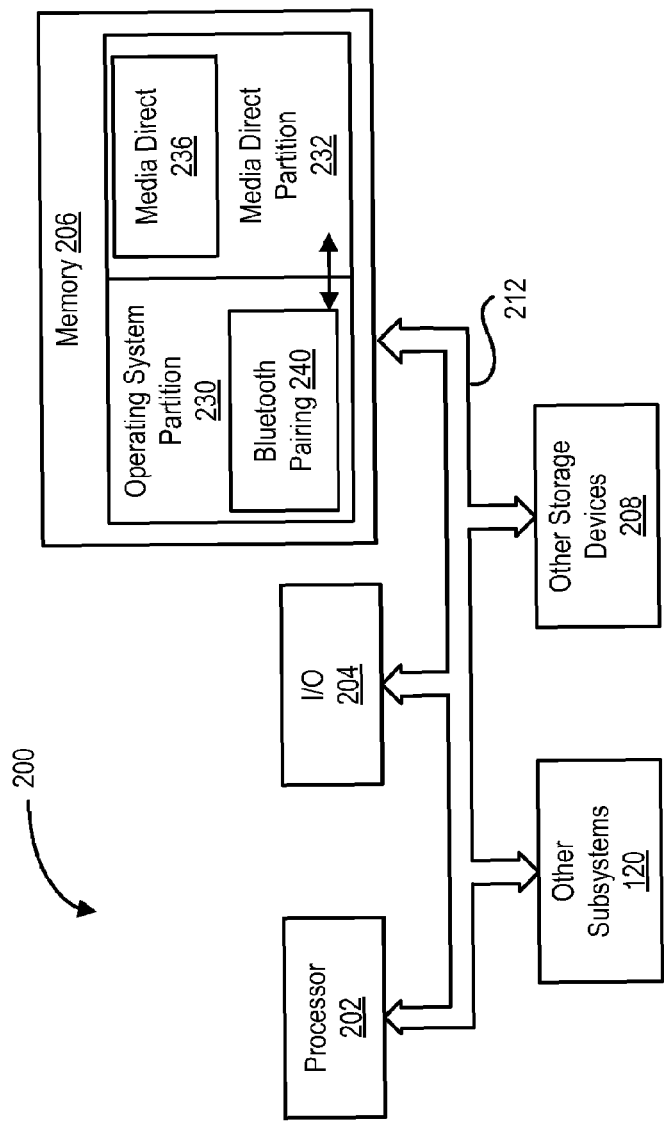
FIG. 2 shows a system block diagram of an information handling system.

Referring briefly to FIG. 2, a system block diagram of an information handling system 200 is shown. The information handling system 200 includes a processor 202, input/output (I/O) devices 204, such as a display, a keyboard, a mouse, and associated controllers, memory 206, including volatile memory such as random access memory (RAM) and non-volatile memory such as read only memory (ROM) and hard disk drives, and other storage devices 208, such as a floppy disk and drive or CD-ROM disk and drive, and various other subsystems 210, all interconnected via one or more buses 212. The memory 206 includes an operating system partition 230 as well as an instant on partition n232. The instant on partition 232 includes an instant on application 236 such as a MediaDirect application.

The operating system partition 230 includes a multiple partition Bluetooth pairing module 240. The multiple partition Bluetooth pairing module 240 enables sharing Bluetooth pairs across a plurality of operating system partitions.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
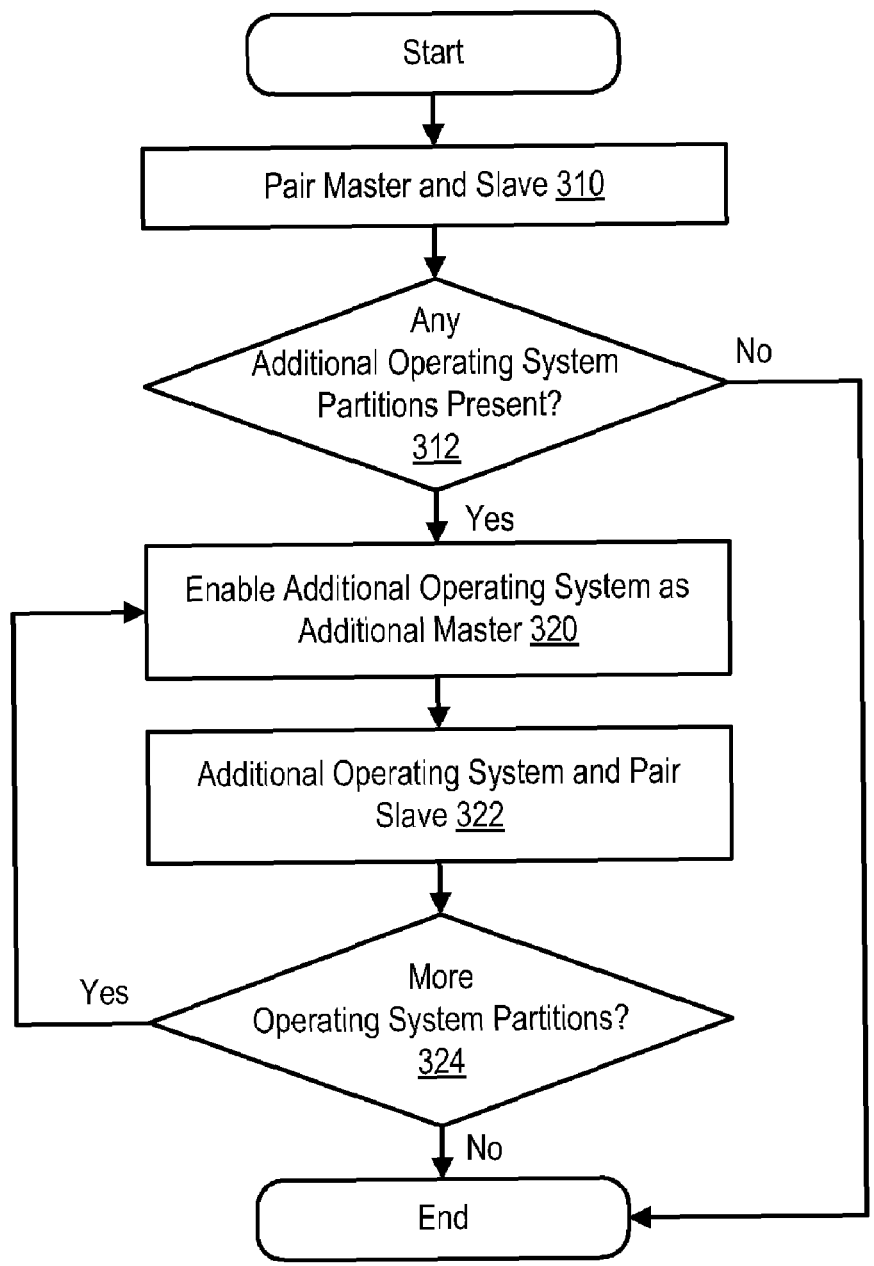
FIG. 3 shows a flow chart of the operation of a multiple partition pairing module for multiple operating system partitions.

Referring to FIG. 3, a flow chart of the operation of the multiple partition pairing module 240 when pairing multiple operating system partitions is shown. More specifically, the multiple partition pairing module 240 starts a pairing operation by pairing a master device and a slave device at step 310. Next, the multiple partition pairing module 240 determines whether any additional operating system partitions are present at step 312. If no additional operating system partitions are present, then the operation of the multiple operating system pairing module 240 completes.

If an additional operating system partition is present, then the multiple partition pairing module 240 enables the additional operating system as an additional master device at step 320 and pairs the additional operating system with the slave device at step 322. Next, the multiple partition pairing module 240 determines whether any additional unpaired operating system partitions are present at step 324. If an additional operating system partition is present, then the multiple partition pairing module 240 enables the additional operating system as an additional master device at step 320. If no additional operating system partitions are present, then the operation of the multiple operating system pairing module 240 completes.

Figure 4:
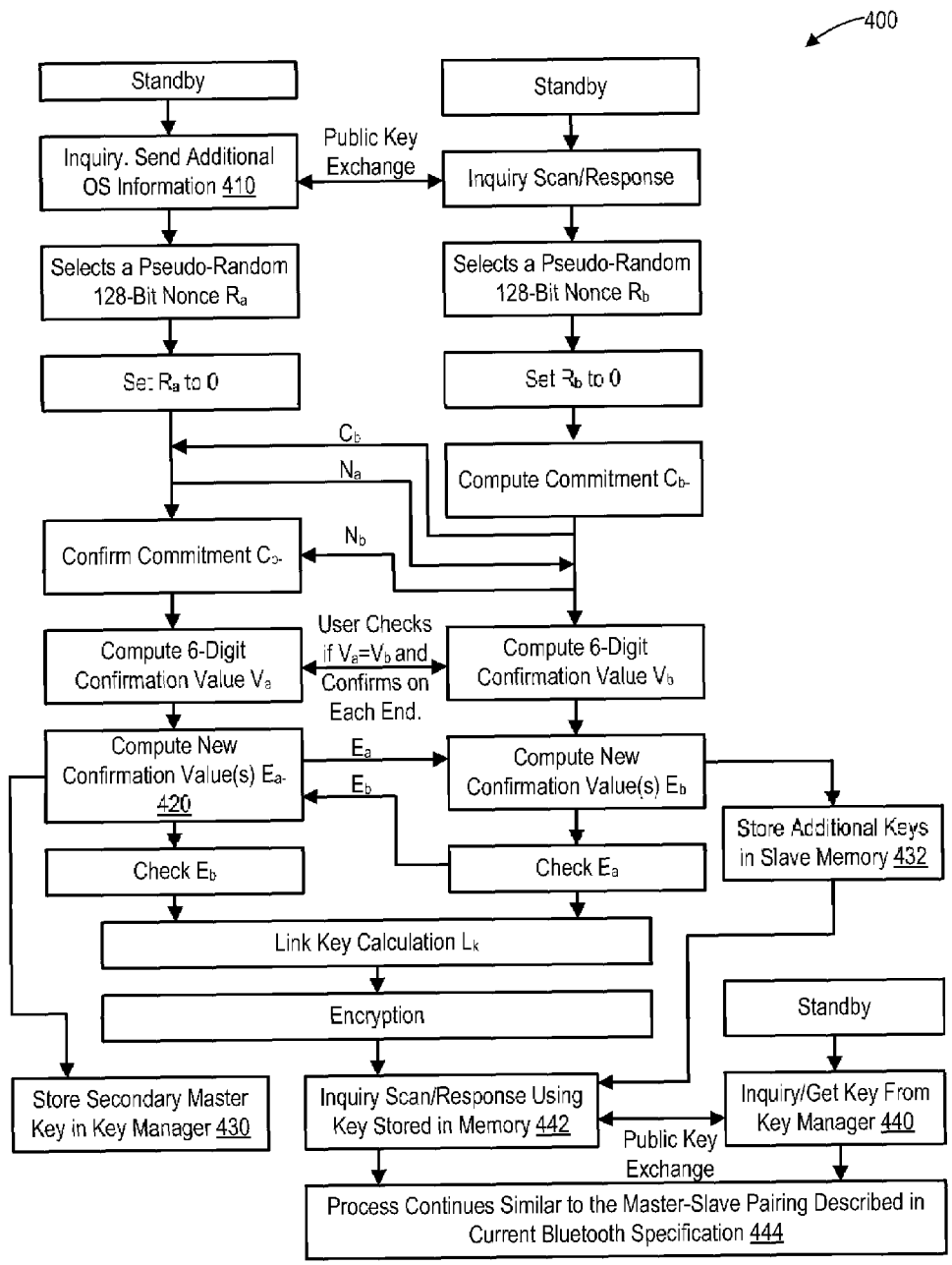
FIG. 4 shows a flow chart of an example of a pairing operation for multiple operating system partitions.

Referring to FIG. 4, a flow chart of an example of a pairing operation 400 for multiple operating system partitions is shown. More specifically, with this pairing operation 400, Phase 2 of the pairing operation includes a step 410 to check with the main operating system on how many additional partitions or operating systems the pairing needs to be shared across on the same information handling system. If there is more than one operating system on the information handling system, then the pairing process generates additional keys at step 420 and new confirmation values at step 422. Once an additional key is created, the key is stored in a key manager at step 430. The additional keys are stored in the slave memory at step 432 The key is then shared with the other operating systems using a key manager. The key manager is responsible for passing keys across multiple partitions. When a user boots into the secondary master operating system (e.g., MediaDirect application 236), the secondary master operating system initiates a connection using a key that is passed to the secondary master operating system via the key manager at step 440 and the inquiry scan response is generated suing the additional key stored within the slave memory at step 442. The secondary master and primary slave pairing connection is authenticated in a similar manner as the Primary Master at step 444.

In this example, the key manager generates a single key only for the I/O device pairing, and provides the key to each partition as the partition executes. The key manager generates a logical mapping between multiple keys that are passed to each partition, and the key it negotiated with the slave device. This requires the slave device to only support one pairing.

Figure 5:
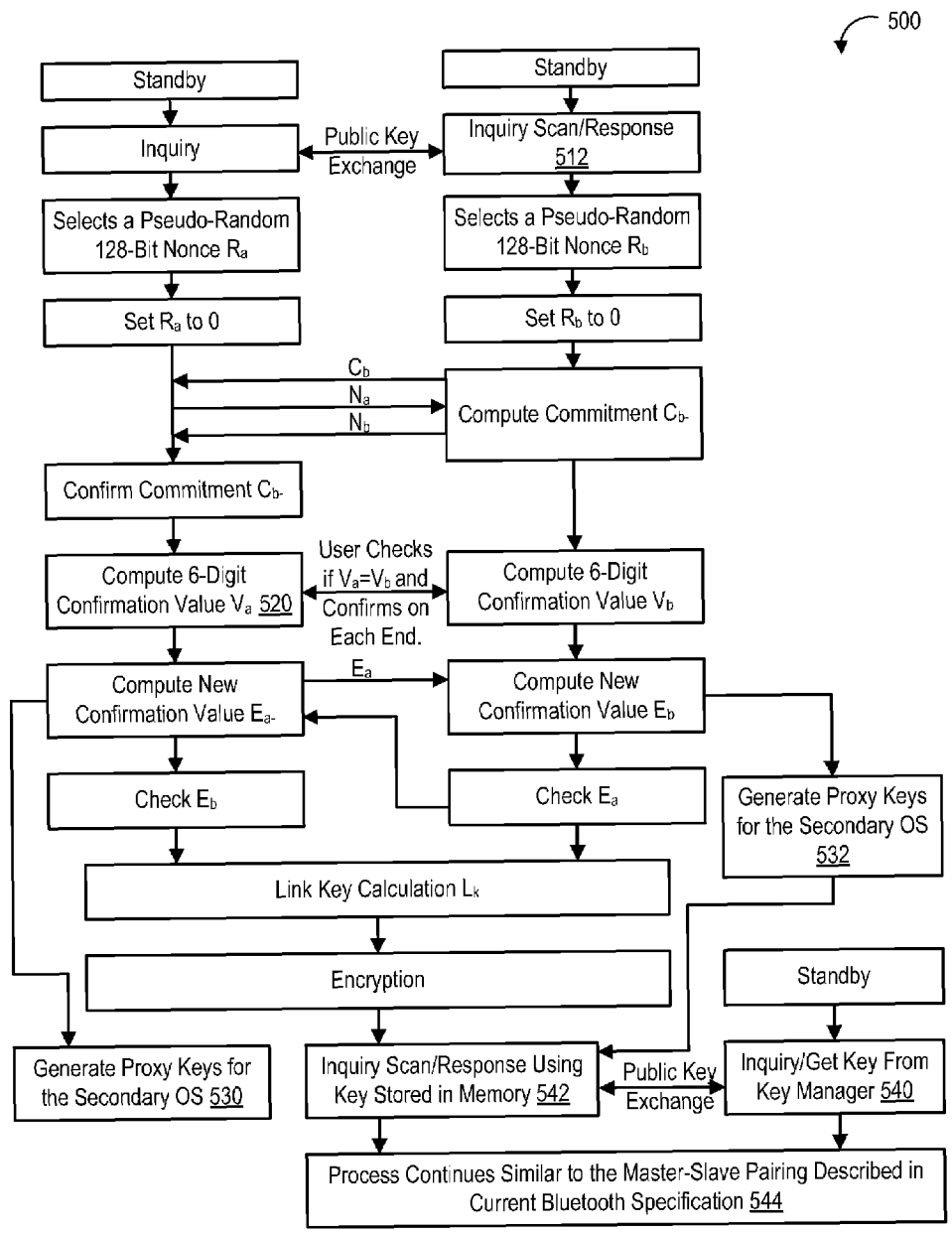
FIG. 5 shows a flow chart of another example of a pairing operation for multiple operating system partitions.

Referring to FIG. 5, a flow chart of another example of a pairing operation 500 for multiple operating system partitions is shown. More specifically, with this pairing operation 500, the slave inquires from the master on how many additional operating systems should be supported by the slave at step 512. Based on the number of operating systems to be supported, the slave generates additional keys at step 532. The master can either make a request from the additional operating system for its public key or create a proxy public key for the additional operating system at step 530. The pairing can be pre-authenticated and setup so that when a user boots to the secondary master operating system, the slave recognizes the device and uses the pre-authenticated key to setup a connection (steps 540, 542).

Figure 6:
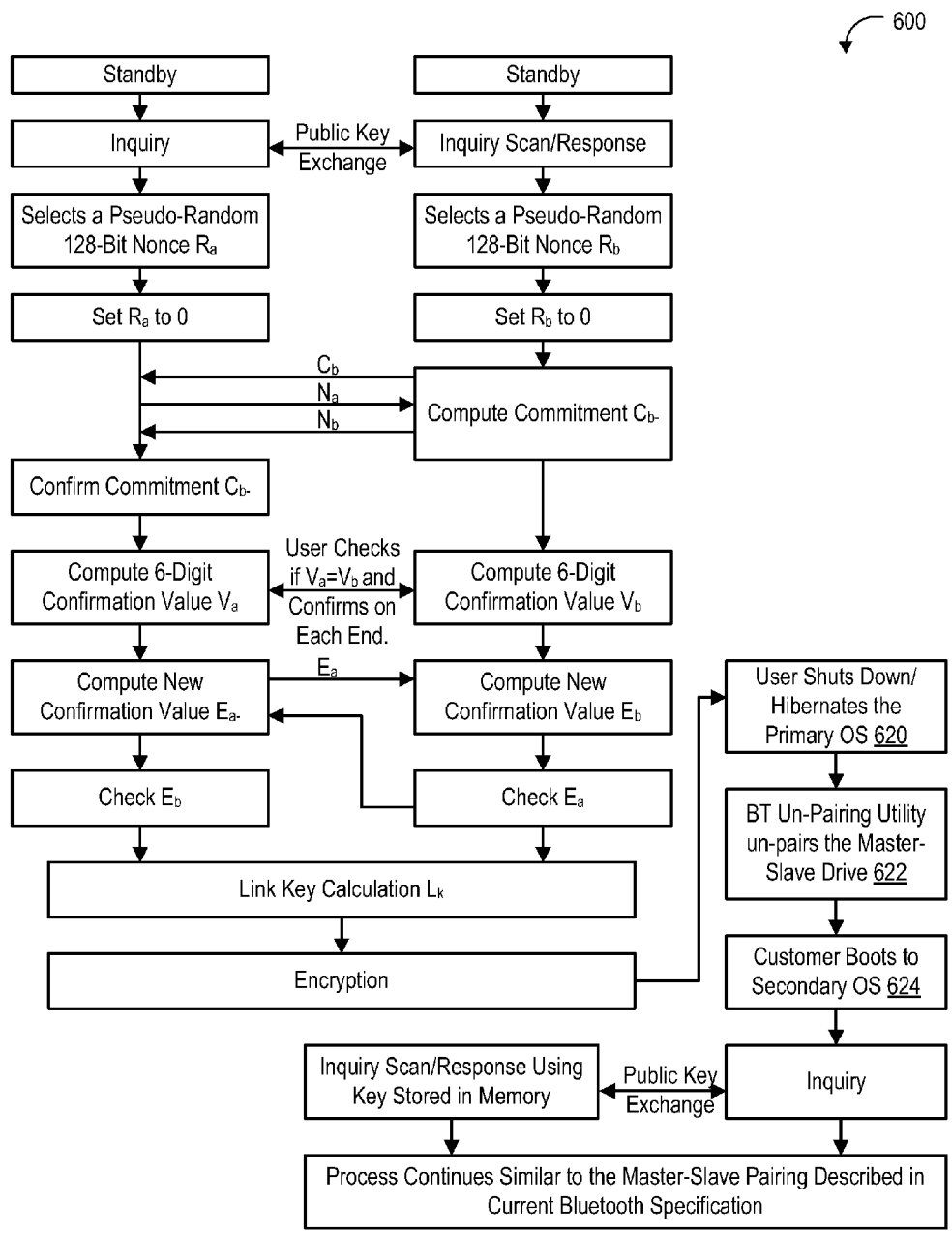
FIG. 6 shows a flow chart of another example of a pairing operation for multiple operating system partitions.

FIG. 6 shows a flow chart of another example of a pairing operation 600 for multiple operating system partitions. More specifically, when a user shuts down or hibernates a primary operating system at step 620, a Bluetooth un-pairing utility is run that un-pairs the master and slave pairing at step 622. The utility is responsible for un-pairing the MASTER-SLAVE devices before the system shuts down. When the user switches to a secondary operating system at step 624, the Bluetooth pairing is re-initiated so that the Bluetooth device can work in the secondary operating system. When the key exchange is eventually made, then the master-slave relationship is identical to that described in the current Bluetooth specification.

In certain embodiments using this pairing operation 600, rather than un-pairing, each operating system is enabled to utilize the key by using a shared memory (or shared resource) in the operating system (e.g. a semaphore).

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, other methods for obtaining the pairing are contemplated. For example, in certain embodiments, each operating system performs a key context switch operation. As the operating system launches, the operating system saves the previous key, negotiates a new key with the device, and restores the previous key as it exits. This context switch enables a pairing operation in cases where use of a key manager is not feasible to implement.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for sharing Bluetooth pairs across multiple operating system partitions within an information handling system comprising:

pairing a first operating system partition with a Bluetooth enabled device determining when a memory of an information handling system includes an additional operating system partition;

pairing the additional operating system partition with the Bluetooth enabled device when the additional operating system partition is present, the pairing the additional operating system comprising computing an additional key for the additional operating system;

storing the additional key within a key manager; and, storing the additional keys within a slave memory of the Bluetooth enabled device.

2. The method of claim 1 wherein
the information handling system includes a plurality of additional operating system partitions; and
the pairing the additional operating system comprises pairing each of the plurality of additional operating system partitions.

3. A method for sharing Bluetooth pairs across multiple operating system partitions within an information handling system comprising:
pairing a first operating system partition with a Bluetooth enabled device determining when a memory of an information handling system includes an additional operating system partition;
pairing the additional operating system partition with the Bluetooth enabled device when the additional operating system partition is present, the pairing the additional operating system comprising:
computing an additional confirmation value for the additional operating system;
generating an additional operating system partition proxy key within the additional operating system partition based upon the additional confirmation value; and,
generating a proxy key for the additional operating system within the Bluetooth enabled device.

4. A method for sharing Bluetooth pairs across multiple operating system partitions within an information handling system comprising:
pairing a first operating system partition with a Bluetooth enabled device determining when a memory of an information handling system includes an additional operating system partition;
pairing the additional operating system partition with the Bluetooth enabled device when the additional operating system partition is present, the pairing the additional operating system comprising:
un-pairing the first operating system partition;
booting the information handling system into the additional operating system;
generating an additional operating system partition key within the additional operating system partition; and,
generating an additional operating system partition key for the additional operating system within the Bluetooth enabled device;
pairing the additional operating system partition based upon an inquiry scan using the additional operating system partition key.

5. An apparatus for sharing Bluetooth pairs across multiple operating system partitions within an information handling system comprising:
means for pairing a first operating system partition with a Bluetooth enabled device
means for determining when a memory of an information handling system includes an additional operating system partition;
means for pairing the additional operating system partition with the Bluetooth enabled device when the additional operating system partition is present, the means for pairing the additional operating system comprising
means for computing an additional key for the additional operating system;
means for storing the additional key within a key manager; and,
means for storing the additional keys within a slave memory of the Bluetooth enabled device.

6. The apparatus of claim 5 wherein
the information handling system includes a plurality of additional operating system partitions; and
the pairing the additional operating system comprises pairing each of the plurality of additional operating system partitions.

7. An apparatus for sharing Bluetooth pairs across multiple operating system partitions within an information handling system comprising:
means for pairing a first operating system partition with a Bluetooth enabled device
means for determining when a memory of an information handling system includes an additional operating system partition;
means for pairing the additional operating system partition with the Bluetooth enabled device when the additional operating system partition is present, the means for pairing the additional operating system comprising
means for computing an additional confirmation value for the additional operating system;
means for generating an additional operating system partition proxy key within the additional operating system partition based upon the additional confirmation value; and,
means for generating a proxy key for the additional operating system within the Bluetooth enabled device.

8. An apparatus for sharing Bluetooth pairs across multiple operating system partitions within an information handling system comprising:
means for pairing a first operating system partition with a Bluetooth enabled device
means for determining when a memory of an information handling system includes an additional operating system partition;
means for pairing the additional operating system partition with the Bluetooth enabled device when the additional operating system partition is present, the means for pairing the additional operating system comprising
means for un-pairing the first operating system partition;
means for booting the information handling system into the additional operating system;
means for generating an additional operating system partition key within the additional operating system partition; and,
means for generating an additional operating system partition key for the additional operating system within the Bluetooth enabled device;
pairing the additional operating system partition based upon an inquiry scan using the additional operating system partition key.

9. An information handling system comprising:
a processor;
memory coupled to the processor, the memory comprising a plurality of operating system partitions, the memory storing a system for sharing Bluetooth pairs across multiple operating system partitions, the system comprising instructions executable by the processor for:
pairing a first operating system partition with a Bluetooth enabled device
determining when a memory of an information handling system includes an additional operating system partition;
pairing the additional operating system partition with the Bluetooth enabled device when the additional operating system partition is present, the pairing the additional operating system comprising instructions executable by the processor for computing an additional key for the additional operating system storing the additional key within a key manager; and, storing the additional keys within a slave memory of the Bluetooth enabled device.

10. The information handling system of claim 9 wherein the memory comprises a plurality of additional operating system partitions; and the instructions for pairing the additional operating system comprises instructions for pairing each of the plurality of additional operating system partitions.

11. An information handling system comprising:

a processor memory coupled to the processor, the memory comprising a plurality of operating system partitions, the memory storing a system for sharing Bluetooth pairs across multiple operating system partitions, the system comprising instructions executable by the processor for:

pairing a first operating system partition with a Bluetooth enabled device determining when a memory of an information handling system includes an additional operating system partition pairing the additional operating system partition with the Bluetooth enabled device when the additional operating system partition is present, the pairing the additional operating system comprising instructions executable by the processor for computing an additional confirmation value for the additional operating system;

generating an additional operating system partition proxy key within the additional operating system partition based upon the additional confirmation value; and, generating a proxy key for the additional operating system within the Bluetooth enabled device.

12. An information handling system comprising:

a processor memory coupled to the processor, the memory comprising a plurality of operating system partitions, the memory storing a system for sharing Bluetooth pairs across multiple operating system partitions, the system comprising instructions executable by the processor for:

pairing a first operating system partition with a Bluetooth enabled device determining when a memory of an information handling system includes an additional operating system partition;

pairing the additional operating system partition with the Bluetooth enabled device when the additional operating system partition is present, the pairing the additional operating system comprising instructions executable by the processor for un-pairing the first operating system partition;

booting the information handling system into the additional operating system;

generating an additional operating system partition key within the additional operating system partition; and, generating an additional operating system partition key for the additional operating system within the Bluetooth enabled device;

pairing the additional operating system partition based upon an inquiry scan using the additional operating system partition key.

* * * * *